(12) United States Patent
Schoener et al.

(10) Patent No.: US 9,597,968 B2
(45) Date of Patent: Mar. 21, 2017

(54) SHROUD FOR ELECTRIC VEHICLE CHARGER RECEPTACLE

(71) Applicant: GM GLOBAL TECHNOLOGY OPERATIONS LLC, Detroit, MI (US)

(72) Inventors: David A. Schoener, Grand Blanc, MI (US); John P. Person, Milford, MI (US); Lisa K. Hackney, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 692 days.

(21) Appl. No.: 13/962,538

(22) Filed: Aug. 8, 2013

(65) Prior Publication Data

US 2015/0042275 A1    Feb. 12, 2015

(51) Int. Cl.
*H02J 7/00* (2006.01)
*B60L 11/18* (2006.01)
*H01R 13/52* (2006.01)

(52) U.S. Cl.
CPC ....... *B60L 11/1816* (2013.01); *B60L 11/1818* (2013.01); *H01R 13/5213* (2013.01);
(Continued)

(58) Field of Classification Search
CPC ........... H01R 13/6581; H01R 13/5202; H01R 13/5221; H01R 13/5205; H01R 13/521; H01R 13/5213; H01R 2201/26; H01R 13/5227; H01R 13/2421; H01R 13/424; H01R 13/4367; H01R 13/502; H01R 13/52; H01R 13/6275; H01R 13/641; H01R 13/703; H01R 2107/00; H01R 24/28; H01R 43/002; Y02T 10/7005; Y02T 90/14; Y02T 10/7072; Y02T 90/121; Y02T 10/7088; Y02T 90/12; Y02T 90/128; Y02T 90/163; B60L 11/1818; B60L 2270/32; B60L 2270/34;
(Continued)

(56) References Cited

U.S. PATENT DOCUMENTS 5,909,100 A     6/1999  Watanabe et al.
2005/0255748 A1  11/2005  Kameyama et al.
(Continued)

FOREIGN PATENT DOCUMENTS

CN      202068024 U    12/2011
CN      101237091 B     6/2012
(Continued)

OTHER PUBLICATIONS

State Intellectual Property Office of the Peoples Republic of China, Office Action in Chinese Patent Application No. 201410388346.3 mailed Feb. 1, 2016.
(Continued)

*Primary Examiner* — Nha Nguyen
(74) *Attorney, Agent, or Firm* — Lorenz & Kopf, LLP

(57) ABSTRACT

A boot-like shroud or cover that forms a compressive seal around the charging receptacle of an electric vehicle is provided to shield a charging port housing and a charging port hinge pocket. The boot-like shroud or cover may be configured as an integral part of the charging handle or a separate part that easily attaches to the handle for outdoor use. The part may also be suitable for use in conjunction with multiple vehicle types.

20 Claims, 6 Drawing Sheets

(52) U.S. Cl.
CPC ...... *H01R 13/5219* (2013.01); *Y02T 10/7005* (2013.01); *Y02T 10/7072* (2013.01); *Y02T 90/14* (2013.01)

(58) Field of Classification Search
CPC .............. B60L 11/1816; B60L 11/1824; B60L 11/1825; B60L 2230/12; B60L 2230/16
See application file for complete search history.

(56) References Cited

U.S. PATENT DOCUMENTS

| | | | | |
|---|---|---|---|---|
| 2008/0142637 A1* | 6/2008 | Lesage | ............... | H01R 13/5213 244/129.1 |
| 2013/0078846 A1* | 3/2013 | Sasaki | ................ | B60L 11/1818 439/374 |
| 2014/0113479 A1* | 4/2014 | Yoon | ................. | H01R 13/4367 439/372 |

FOREIGN PATENT DOCUMENTS

| | | |
|---|---|---|
| CN | 102782950 A | 11/2012 |
| CN | 202997174 U | 6/2013 |

OTHER PUBLICATIONS

State Intellectual Property Office of the People's Republic of China, Office Action in Chinese Patent Application No. 201410388346.3 mailed Oct. 27, 2016.

* cited by examiner

SHROUD FOR ELECTRIC VEHICLE CHARGER RECEPTACLE

TECHNICAL FIELD

Embodiments described herein relate generally to electric and hybrid vehicles, and more particularly, to a protective shroud or boot for preventing rain, snow, ice, and the like from entering and accumulating in and around the charging receptacle housing and associated door hinge pocket while the vehicle is being charged outdoors.

BACKGROUND

Drivers residing in colder climates are familiar with the unpleasant task of removing snow and ice that may accumulate when their vehicles are parked outdoors. The drivers of electric and hybrid vehicles face an additional but related challenge; that is, the collection and accumulation of water, ice, and snow around and/or within the charging port, the charging port housing, and the hinge pocket associated with the charging port door, which is left open when a charging plug and cable is connected to the charging receptacle within the charging port. The collection of snow and/or ice in the hinge pocket may prevent the charging port door from closing and possibly damage the hinge and door assembly if the door is forced closed. Snow, ice, and water and/or other contaminants may be introduced into the charging receptacle itself resulting in water-related issues. Additionally, if water freezes between the plug and the receptacle, the driver may have difficulty removing the plug from the receptacle.

In view of the forgoing, it would be desirable to provide a boot-like shroud or cover that forms a compressive seal around the receptacle housing shielding the charging port housing and the charging port hinge pocket from environmental weather elements such as rain, snow, ice, and the like. It would further be desirable that the boot-like cover be configured to be an integral part of the charging handle or as a separate part that easily attaches to the handle for outdoor use and configured for use in conjunction with multiple vehicle types.

BRIEF SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

A system for charging a battery powered vehicle is provided. The vehicle includes a charging receptacle that may be electrically coupled to the battery. The system comprises a source of electrical energy, a connector electrically coupled to the source for charging the battery when the connector is electrically coupled to the receptacle, and a shroud on the connector for preventing the receptacle and/or hinge pocket from being exposed to rain, ice, snow, and the like.

There is also provided a connector for use with a battery powered vehicle having a vehicle mounted receptacle for electrical coupling to the battery, and having a source of electrical energy for coupling to the receptacle. The connector comprises a handle section, a plug electrically coupled to the handle section for coupling the receptacle to charge the battery, and a shroud coupled to the handle for seemingly engaging the periphery of the receptacle when the plug is electrically coupled to the receptacle to prevent entry of snow, ice, rain and the like.

Further, there is provided a shroud for use in conjunction with a connector that conducts electrical energy from a source of electrical energy to a battery powered vehicle via a charging receptacle on the vehicle. The connector includes a handle section and a plug for electrically engaging the receptacle. The shroud comprises a sealing section for seemingly engaging the receptacle, and an attachment section coupled to the sealing section for attaching to the handle section.

BRIEF DESCRIPTION OF THE DRAWINGS

A more complete understanding of the subject matter may be derived by referring to the detailed description and claims when considered in conjunction with the following figures, wherein like reference numerals refer to similar elements throughout the figures, and wherein:

DETAILED DESCRIPTION

Detailed embodiments are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein not to be interpreted as limiting, but merely as a representative basis for teaching one skilled in the art.

Figure 1:
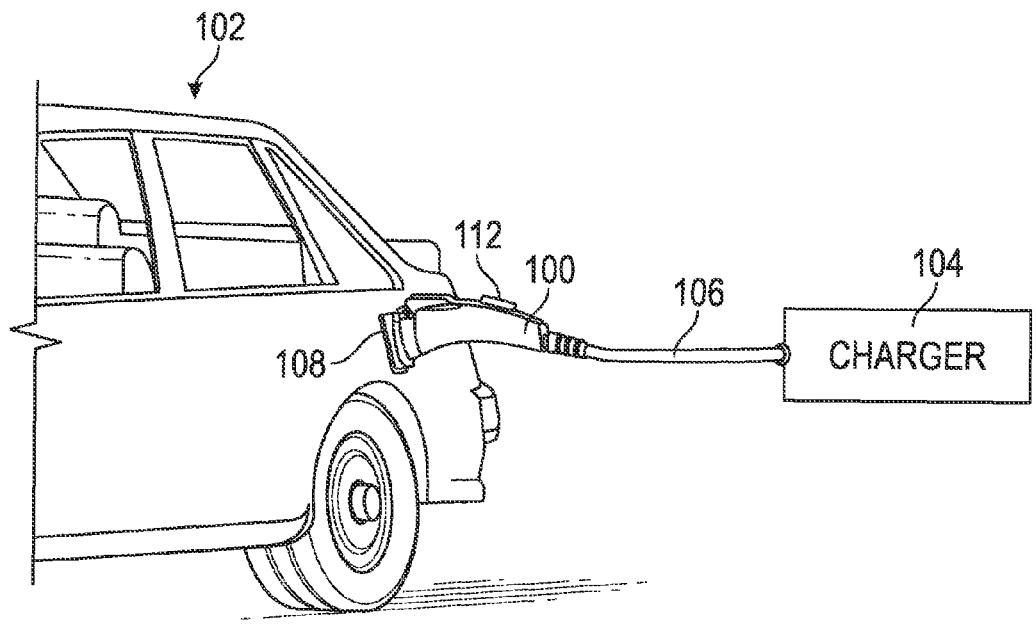
FIG. 1 is an isometric view of a connector assembly that facilitates the charging of an electric or hybrid vehicle in accordance with an exemplary embodiment.

Referring to FIG. 1, there is shown a connector assembly 100 for facilitating the charging of an electric or hybrid vehicle 102. The connector assembly 100 is coupled to a charger 104 (e.g. a standard residential AC power circuit) via a charging cable 106 that is, in turn, coupled to connector assembly 100. Vehicle 102 includes a vehicle charging port 108 and a battery (not shown) that receives electrical power from charger 104. Charging port 108 is externally accessible and receives connector assembly 100. The battery is electrically connected to a receptacle 110 (FIG. 3) accessible through port 108 for the purpose of being charged (i.e. for storing electrical power). Connector assembly 100 also includes a trigger 112 for engaging and releasing a latching mechanism 122 as will be further described in connection with FIG. 2.

Figure 2:
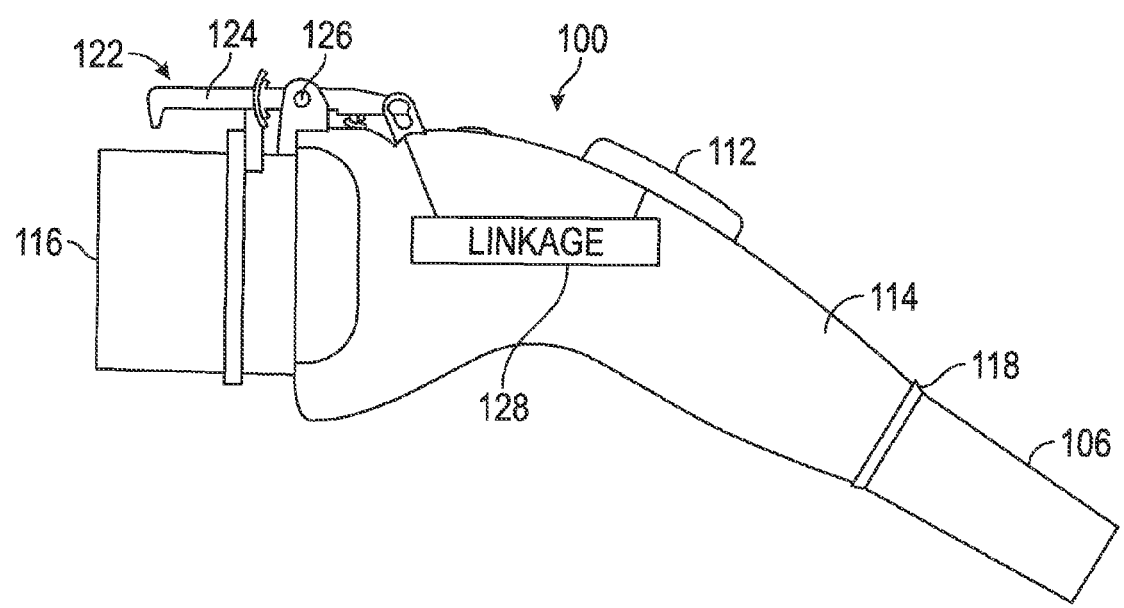
FIG. 2 is a more detailed view of the connector assembly shown in FIG. 1.

Referring to FIG. 2, connector assembly 100 includes an elongated handle 114 and a plug 116 coupled together to charge vehicle 102. Handle 114 includes an inlet 118 for receiving charging cable 106. Plug 116 is configured to electrically engage a charging socket 120 within charging port 108. The socket 120 is designed to matingly receive plug 116 for the purpose of electrically connecting charges 104 to automobile 102 as shown and more fully described in connection with FIG. 3. Connector assembly 100 includes a latching mechanism 122 for attaching the connector assembly 100 to charging receptacle 110 within charging port 108. Latching mechanism 122 is configured to maintain the electrical connection between charger 104 and vehicle 102 by preventing connector assembly 100 from simply disengaging from vehicle 102.

Latching mechanism 122 comprises a lever 124 operatively coupled to a trigger 112 by linkage assembly 128 such that when trigger 112 is depressed, lever 124 pivots clockwise about pin 126 to disengage the connector assembly 100 from the charging port 108. If trigger 112 is released, lever 124 rotates counterclockwise into the latched position. It should be noted that numerous types of mechanisms are known and available to attach and detach the connector assembly 100 and the vehicle 102, and further discussion of this aspect is not deemed necessary.

Figure 3:
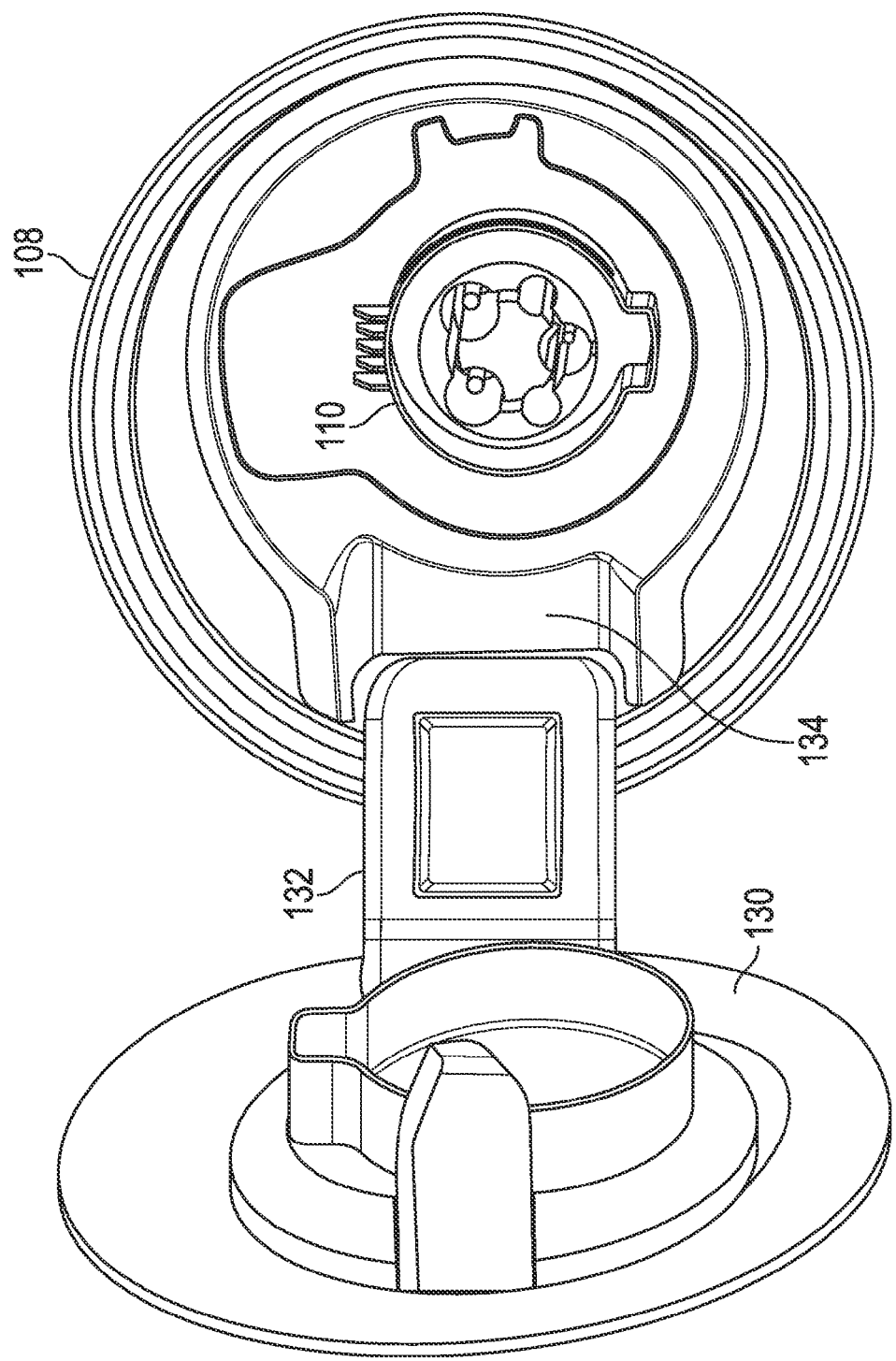
FIG. 3 is an isometric view of a vehicular charging port.
Figure 4:
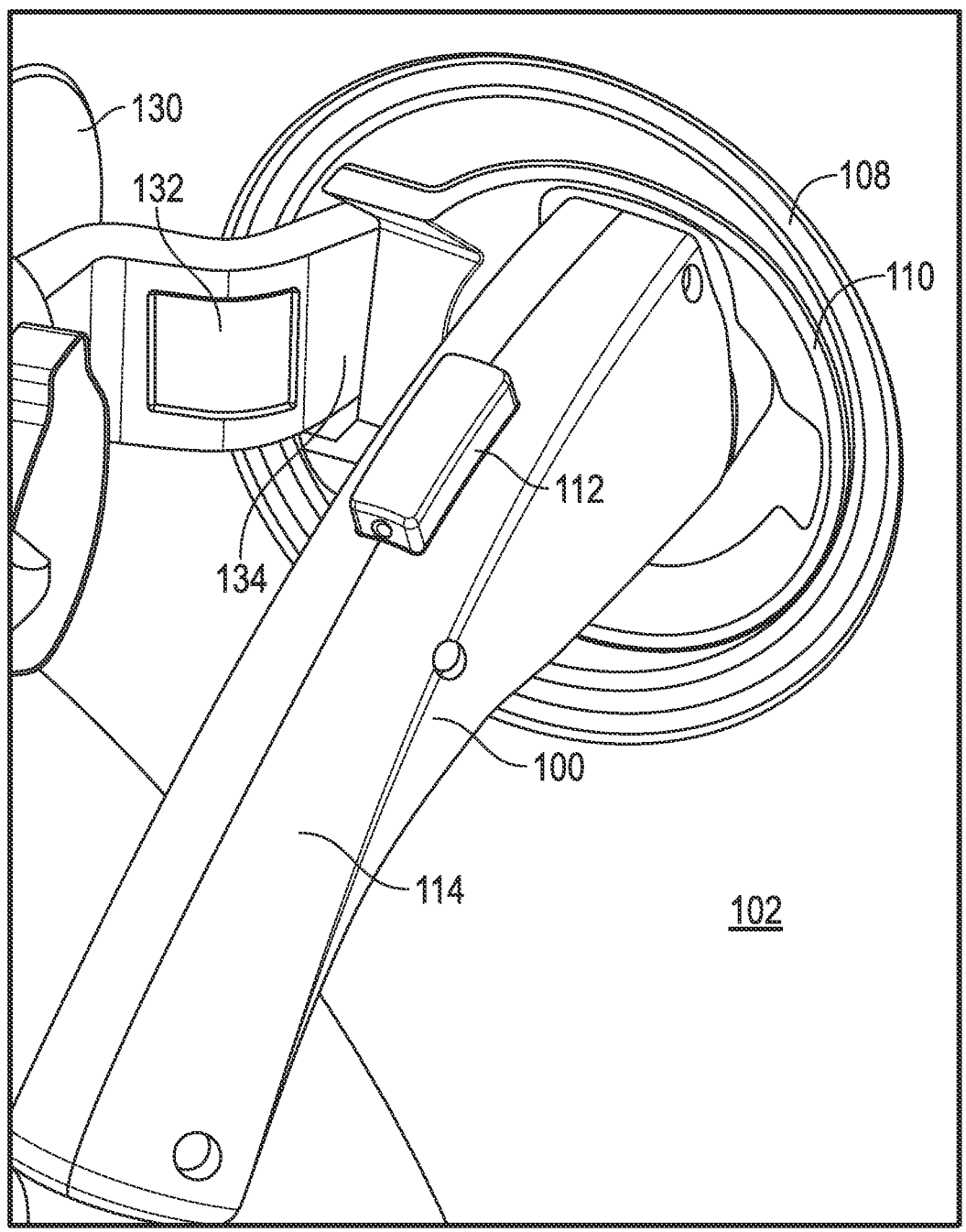
FIG. 4 is our isometric view of the connector assembly engaging the charging port of FIG. 3.

FIG. 3 illustrates the charger port 108 having a door 130 hingedly coupled thereto via hinge 132. In FIG. 3, door 130 is open exposing receptacle 110 and socket 120. As can be seen, when door 130 is open, a hinge cavity 134 is exposed. FIG. 4 is an isometric view showing the connector assembly 100 matingly engaged with receptacle 110.

As described earlier, snow and/or ice can accumulate inside charger port 108 and hinge cavity 134. This may prevent door 130 from properly closing. In addition, snow, ice, and/or water may be inadvertently introduced into the charging receptacle 110. Thus, in accordance with an embodiment, there is provided hood for use in conjunction with connector 100 that shields the charging receptacle 110 and hinge cavity 134 from ice, snow, and/or water.

Figure 5:
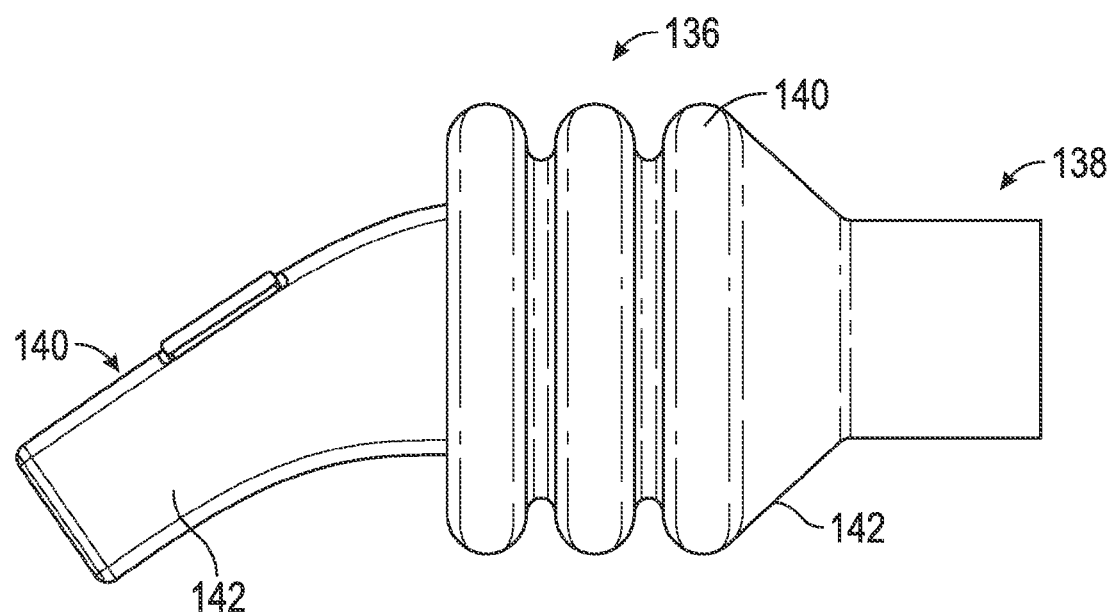
FIGS. 5 and 6 are side and front views, respectively, of a shroud that sealingly engages the charging port of FIG. 3 in accordance with an exemplary embodiment.
Figure 6:
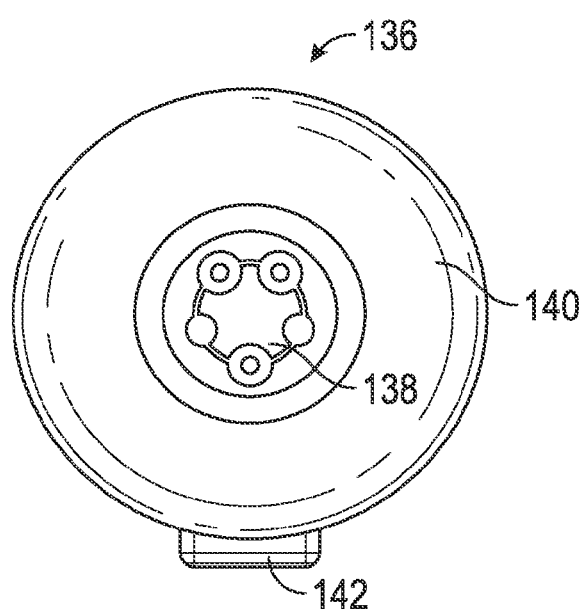
Figure 7:
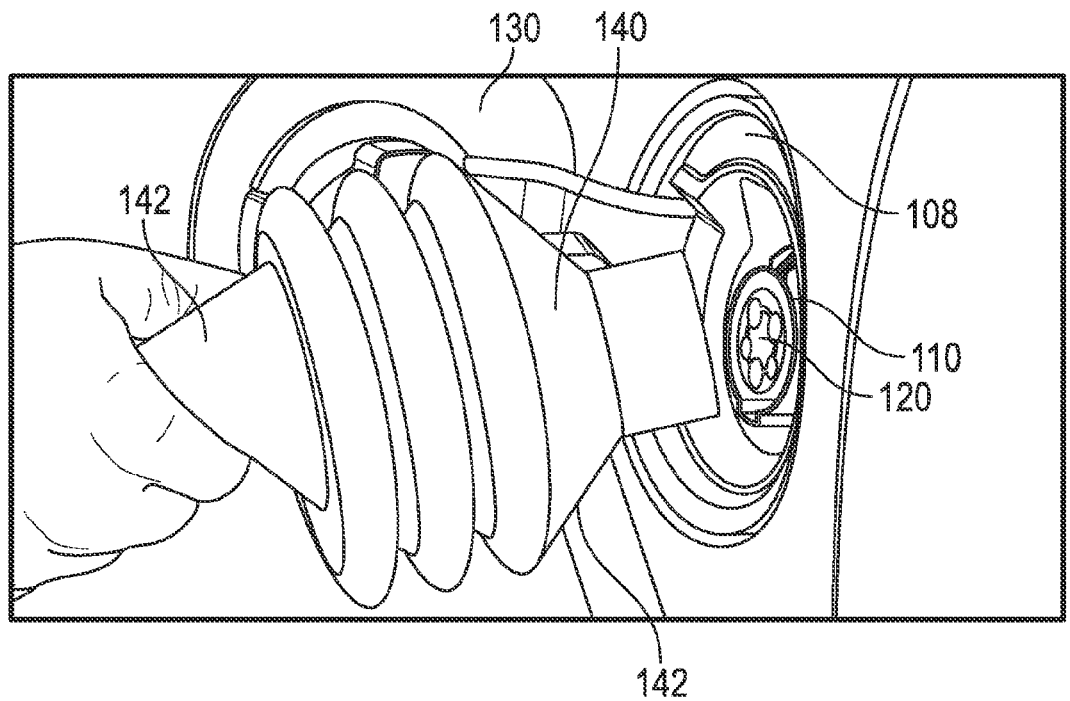
FIGS. 7 and 8 are isometric views of a bellows prior to and after, respectively, engagement with a charging port in accordance with an exemplary embodiment.
Figure 8:
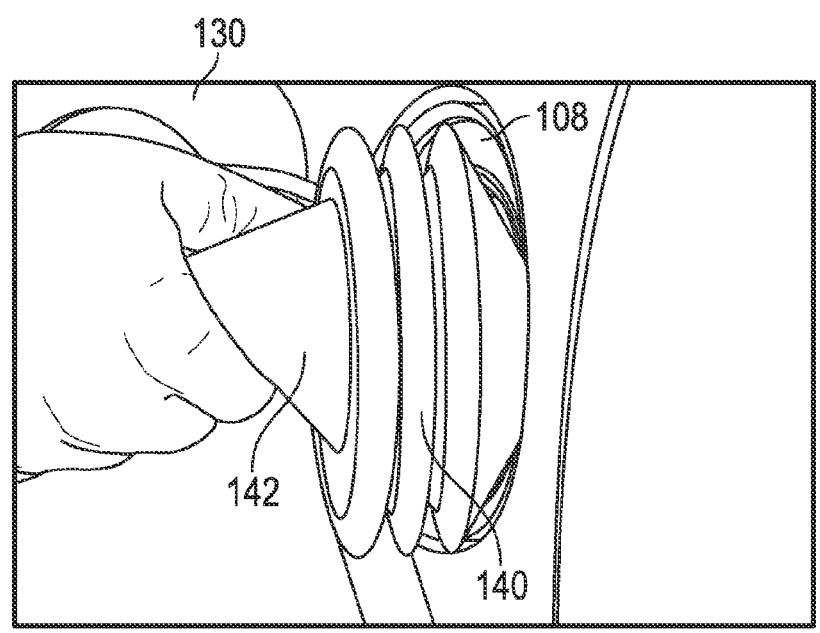

FIGS. 5 and 6 are side and front views, respectively of a shroud 136 for sealingly engaging the perimeter of charging receptacle 110 and the hinge cavity 134 when the plug 116 is attached to the socket 120 during charging in accordance with an embodiment. The shroud 136 is made of a flexible material (e.g. rubber) and includes a proximal end 138 and a distal end 140. Distal end 140 includes an elongated section 142 for surrounding at least a portion of handle 114 such that trigger 112 (FIG. 2) extends therethrough for easy access by a user. Proximal end 138 receives at least plug 116 therein and may also be configured to receive latching mechanism 122 therein. Between distal end 140 and proximal end 138 is a sealing section 136 which, when plug 116 engages receptacle 110 (FIG. 3), sealingly engages charging port 108 and hinge cavity 134 to protect the interiors thereof from the elements. In one embodiment, sealing section 136 comprises a bellows 140, a forward surface 142 of which engages the rim of receptacle 110 including the hinge cavity 134. Of course, other sealing configurations may be employed. FIGS. 7 and 8 illustrate bellows 140 just prior to engagement and after engagement, respectively, with charging receptacle 110.

Figure 9:
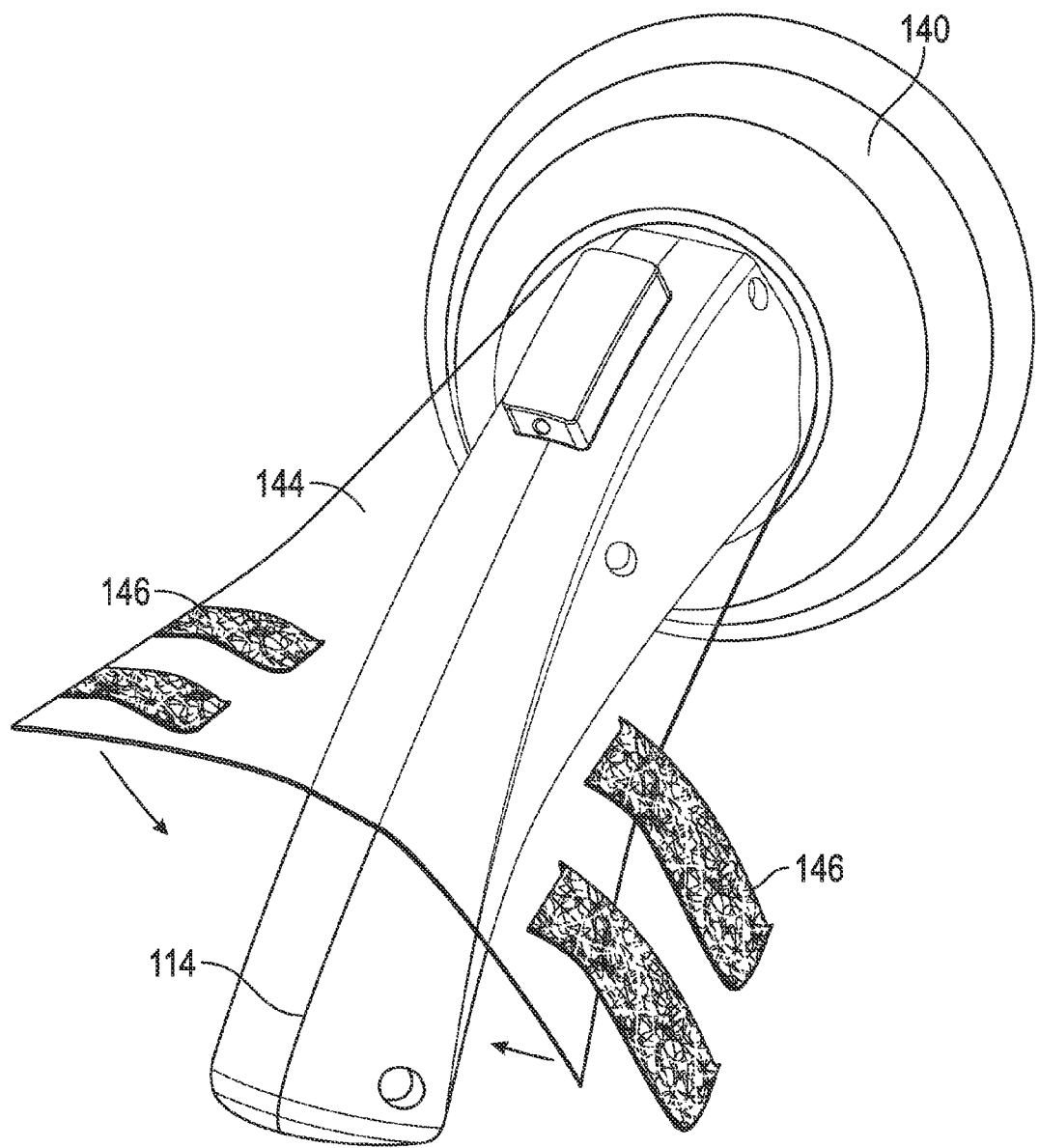
FIG. 9 is an isometric view of a retro-shroud for attachment to the elongate handle of the connector in accordance with an exemplary embodiment.

The protective shroud 136 may be an integral part of charger handle 114 as previously described or may be a separate component that easily attaches to the charger handle 114. Once again, the shroud 136 may be made of rubber or some other flexible material and be flexible in both hot and cold weather. Furthermore, if separate, the shroud 136 may be made to accommodate multiple vehicle types and models. For example, referring to FIG. 9, a retro-shroud may be provided with a bellows 140 or other sealing device that is attached to a securing device such as a flexible sheet 144 that may be secured around handle 114 by any suitable means such as snaps or Velcro® Brand adhesive strips 146.

Thus, there has been provided a boot-like shroud or cover that forms a compressive seal around the charging receptacle 110 of an electric vehicle is to shield a charging port housing 108 and a charging port hinge pocket 134. The boot-like shroud or cover may be configured as an integral part of the charging handle 114 or as a separate part that easily attaches to the handle 114 for outdoor use. The part may also be suitable for use in conjunction with multiple vehicle types.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for charging a battery powered vehicle and including a charging receptacle on the vehicle electrically coupled to the battery, wherein the charging receptacle is disposed within a charging port having a charging port housing, a hinged door, and a hinge pocket, the system comprising:
   a source of electrical energy;
   a connector electrically coupled to the source for charging the battery when the connector is electrically coupled to the receptacle; and
   a shroud on the connector for preventing the connector from being exposed to weather related elements, wherein the shroud forms a compressive seal around the charging receptacle that covers both the charging port housing and the hinge pocket.

2. The system of claim 1 wherein the shroud additionally prevents the hinge pocket and the charging port housing from being exposed to the elements.

3. The system of claim 2 wherein the shroud is integrally formed with the connector.

4. The system of claim 2 wherein the shroud is removable from the connector.

5. The system of claim 3 wherein the connector includes a handle section and a plug section to be received in the receptacle and wherein the shroud further comprises a first section for sealingly engaging a periphery of the receptacle.

6. The system of claim 5 wherein the first section comprises a bellows.

7. The system of claim 4 wherein the shroud comprises a first section for sealingly engaging the periphery of the receptacle.

8. The system of claim 7 wherein the shroud further comprises a second section coupled to the sealing section for detachably securing the sealing section to the handle.

9. The system according to claim 8 wherein the sealing section is a bellows.

10. The system according to claim 9 where in the second section is attached to the sealing portion and comprises:
    a flexible material; and
    a first means on the flexible material for attaching the flexible material to the handle.

11. The system of claim 10 wherein the flexible material is rubber.

12. The system of claim 10 wherein the attachment means comprises first and second adhesive strips.

13. A connector for use in a battery powered vehicle having a vehicle mounted receptacle electrically coupled to the battery and wherein there is provided a source of electrical energy for coupling to the receptacle, and wherein the receptacle is disposed within a charging port having a charging port housing, a hinged door, and a hinge pocket, the connector comprising:
- a handle section;
- a plug electrically coupled to the handle section for coupling the receptacle to charge the battery; and
- a shroud coupled to the handle, for sealingly engaging the periphery of the receptacle when the plug is electrically coupled to the receptacle, to prevent entry of snow, ice, rain and the like into and around the receptacle, wherein the shroud forms a compressive seal around the receptacle that covers both the charging port housing and the hinge pocket.

14. The connector of claim 13 wherein the shroud is integrally formed with the connector.

15. The connector of claim 13 wherein the shroud is removable from the connector.

16. The connector of claim 14 wherein the shroud comprises a first section for sealingly engaging the periphery of the receptacle.

17. The connector of claim 16 wherein the first section comprises a bellows.

18. A shroud for use in conjunction with a connector that conducts electrical energy from a source of electrical energy to a battery powered vehicle via a charging receptacle on the vehicle, wherein the charging receptacle is disposed within a charging port having a charging port housing, a hinged door, and a hinge pocket, and wherein the connector includes a handle section and a plug for electrically engaging the charging receptacle, the shroud comprising:
- a sealing section for sealingly engaging the charging receptacle, wherein the shroud forms a compressive seal around the charging receptacle that covers both the charging port housing and the hinge pocket; and
- an attachment section coupled to the sealing section for attaching to the handle section.

19. The shroud of claim 18 wherein the sealing section is a bellows.

20. The shroud of claim 18 wherein the attachment section comprises:
- a flexible material; and
- adhesive strip on the flexible material for attaching the flexible material to the handle.

* * * * *